Figure 1:
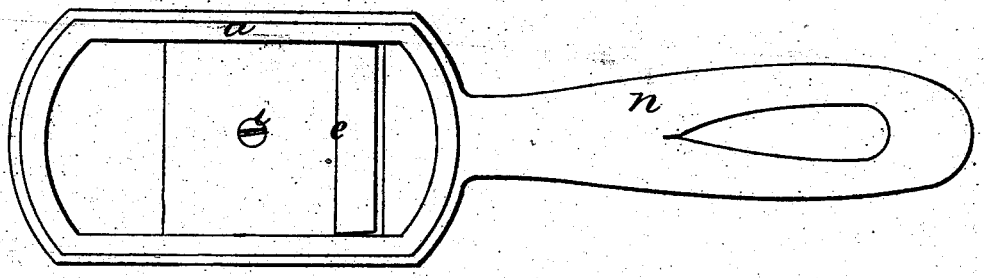

Harkness & Mack,
Ice Shaver.

No. 48,173. Patented June 13, 1865.

Witnesses:
S. P. Newell
Jesse Gaylord

Inventor:
H. W. Harkness
J. C. Mack
By Jenny W. Bigi

UNITED STATES PATENT OFFICE.

H. W. HARKNESS AND J. C. MACK, OF BRISTOL, CONNECTICUT.

IMPROVED ICE-SCRAPER.

Specification forming part of Letters Patent No. 48,173, dated June 1, 1865.

*To all whom it may concern:*

Be it known that we, H. W. HARKNESS and J. C. MACK, of Bristol, county of Hartford, and State of Connecticut, have invented certain new and useful Improvements in Ice-Scrapers; and we do hereby declare that the same is described and represented in the following specification and drawings, and to enable others skilled in the art to make and use the same, we will proceed to describe its construction by referring to the drawings, in which the same letters indicate like parts in each of the figures.

The nature of this improvement will be understood from the specification and drawings. The object desired to be attained thereby is to produce a cheap, simple, and convenient article for domestic use. As, for instance, almost every family has a refrigerator or place for keeping cakes of ice. By drawing this utensil across said cakes of ice a sufficient quantity will be scraped therefrom in small particles to cool a tumbler or cup of water quicker, without waste, and more easily than can be done by cutting a piece of ice from the cake.

Figure 2:
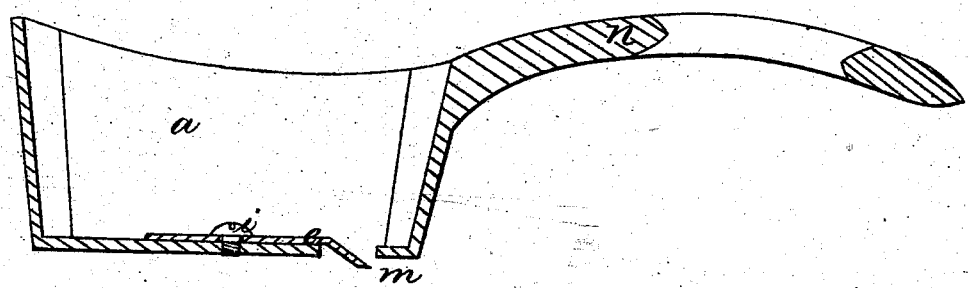

In the accompanying drawings, Figure 1 is a top view, showing the inside of the bowl or body of the utensil and the knife or scraper secured onto the bottom, one end of which is bent so as to extend down through an aperture formed in the bottom. Fig. 2 is a sectional side view, which, in connection with Fig. 1, shows the entire formation and construction of this utensil.

$a$ is the bowl or body. $n$ is the handle. $e$ is the knife or scraper. $i$ is a pin or screw for holding the scraper in place. $m$ is an aperture formed in the bottom, through which the bent end of the plate $e$ protrudes and forms an edge which serves as a scraper. $n$ is a handle for operating this utensil.

From the above description and the drawings it is believed a person skilled in the art will be enabled to make the same.

What we claim, therefore, and desire to secure by Letters Patent, is—

As a new improved article of manufacture, viz., an ice-scraper, the bowl or body $a$, having an aperture, $m$, in its bottom, in combination with the knife or scraper $e$, pin or screw $i$, and handle $n$, substantially as and for the purpose described.

H. W. HARKNESS. [L. S.]
J. C. MACK. [L. S.]

Witnesses:
S. P. NEWELL,
JESSE GAYLORD.